Oct. 26, 1965  J. C. LASH  3,214,224
BEARING ASSEMBLY
Filed April 17, 1963

INVENTOR.
Joseph C. Lash
BY
ATTORNEYS 3,214,224
BEARING ASSEMBLY
Joseph C. Lash, Cleveland, Ohio, assignor to TRW Inc., a corporation of Ohio
Filed Apr. 17, 1963, Ser. No. 273,646
3 Claims. (Cl. 308—176)

The present invention relates to an improved bearing assembly for rotatably supporting a shaft. In particular, the invention relates to a ball bearing assembly of improved characteristics.

In some rotating shaft assemblies wherein the shaft is supported between a pair of spaced ball bearings, the outer race of one bearing is locked to prevent axial movement of the shaft while the outer race of the other bearing is free to move axially and to creep in its retainer. A thrust spring is sometimes used to press against the outer race of the free bearing to remove radial looseness in both bearings, thereby improving bearing performance. During rotation, however, some grease is usually thrown out of the bearings and tends to coat the outside of the outer race of the free bearing and the inside of the retainer. As a result, under some conditions of operation, the outer race of the free bearing tends to rotate excessively, resulting in noisy operation, a scoring of the retainer, the existence of fretting corrosion between the outer race of the free bearing and its retainer, discoloration of the outer race and retainer, and abrasion of the thrust spring at the points of contact.

One of the objects of the present invention is to provide an improved ball bearing assembly which eliminates the undesirable effects created by the excessive rotation of the race in its retainer.

A further object of the invention is to provide a rotating shaft assembly with a fixed and a free bearing, the free bearing being provided with means to increase the friction between the outer race of the bearing and the retainer to interrupt the fluid film which is responsible for permitting excessive rotation of the outer race of the bearing.

A further object of the invention is to provide a bearing assembly which is characterized by quiet operation, freedom from scoring of the retainer, and the absence of fretting corrosion between the outer race of the bearing and the retainer.

A still further object of the invention is to provide a ball bearing assembly which prevents excessive outer bearing race rotation but still permits axial creep of the bearing along the shaft.

In accordance with the present invention, I provide a ball bearing assembly having an inner race and an outer race, with a plurality of balls spaced between the races, together with a retainer which radially confronts the outer periphery of the outer race. The tendency for a film of grease to be trapped between these confronting surfaces of the outer race and the retainer is reduced by providing one or more circumferential grooves in either the wall of the retainer or in the outer wall of the outer race. The presence of the grooves has been found to disrupt the continuous film which would otherwise exist between the outer race and the retainer so that the possibility of slippage between the two is substantially reduced.

A further description of the present invention will be made in conjunction with the attached sheet of drawings which illustrate several embodiments.

Figure 1:
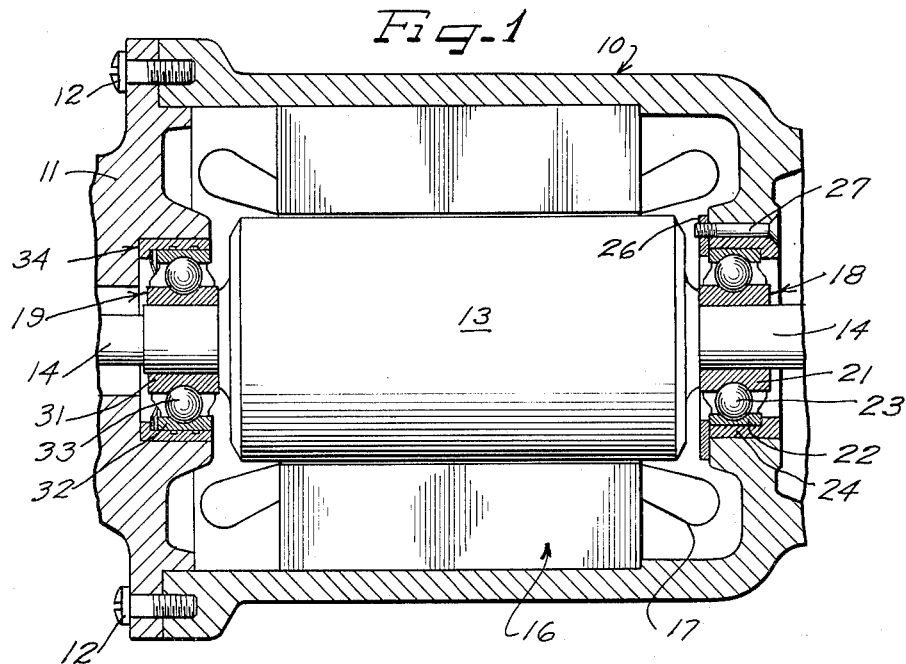
FIGURE 1 is a cross-sectional view of an alternator assembly which embodies the improvements of the present invention.

While the improved bearing assembly of the present invention is illustrated as applied to an alternator in FIGURE 1 of the drawings, it will be recognized, of course, that the bearing assembly has applicability to all types of rotating shaft assemblies. The particular environment shown in FIGURE 1 includes a casing 10 having an end cap 11 secured thereto by means of spaced bolts 12. Within the housing 10 there is disposed an armature 13 carried on a shaft 14, the armature 13 including a permanent magnet assembly (not shown). The armature 13 rotates within a field structure generally indicated at numeral 16 of the drawings and including windings 17 in which the voltage is induced by the rotation of the armature 13.

The shaft 14 is supported for rotation between a pair of ball bearing assemblies, consisting of a fixed bearing 18 and a relatively free bearing 19 on opposite sides of the armature 13. The fixed bearing 18 includes an inner race 21, an outer race 22, and a plurality of ball elements 23 confined therebetween. Relative movement between the outer race 22 and the retainer 24 is prevented by means of a retaining ring 26 secured to the housing 10 by means of a plurality of circumferentially spaced bolts 27.

The relatively free bearing 19 consists of an inner race 31, an outer race 32 and a plurality of ball elements 33 therebetween. The outer race 32 is relatively loosely confined within a retainer ring 34 which has an axially extending annular surface 36 confronting the outer periphery of the outer race 32, and a radially inwardly extending annular flange portion 37 overlying the end of the outer race 32. A thrust spring, such as an undulating washer 38 is interposed between the radially extending annular flange portion 37 and the outer race 32 to urge the outer race 32 axially with respect to the retainer ring 34.

In accordance with the present invention, the tendency toward relative movement between the outer race 32 and the retainer 34 is minimized by providing one or more circumferentially extending grooves between the confronting surfaces of these members. In the form of the invention illustrated in FIGURES 1 and 2, circumferentially extending grooves 39 are provided in the inner periphery of the retainer ring 34. Any lubricant which tends to coat the outside of the outer race 32 is consequently unable to form a continuous film between the outer race 32 and the retainer surface 36 which would permit continuous relative rotation.

Figure 2:
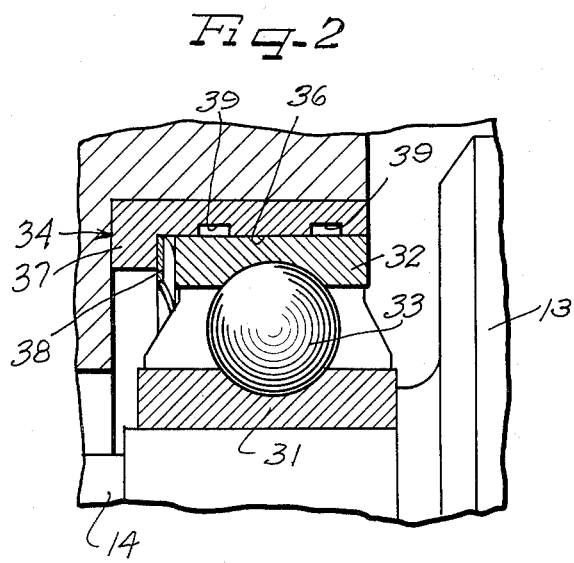
FIGURE 2 is a fragmentary, enlarged view of the outer race and retainer assembly of the improved ball bearing of the present invention.

An alternator assembly was made up employing a bearing assembly of the type shown in FIGURES 1 and 2 of the drawings. Two circumferential grooves were machined into the inner diameter of the retainer and the grooves were filled with grease and the bearing outer race coated with grease. A standard load test was run on the alternator and it was then run-in for one hour. Operation of the alternator was exceptionally quiet.

The unit was disassembled and the bearing retainer examined. There was no evidence of rotation of the bearing outer race.

The unit was cold soaked for four hours at —20° F. Run-in for one hour was repeated. The unit was disassembled and the bearing retainer examined. There was no evidence of rotation of the bearing outer race.

The unit was hot soaked for four hours at 125° F. Run-in for one hour was repeated. The unit was disassembled and the bearing retainer examined. There was no evidence of rotation of the bearing outer race.

Figure 3:
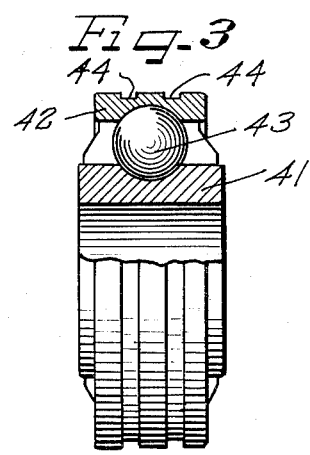
FIGURE 3 is a view partly in elevation and partly in cross-section of a modified form of ball bearing assembly which can be employed in the practice of the present invention.

In FIGURE 3, a modified form of the invention is illustrated in which the bearing assembly includes an inner race 41, an outer race 42, and a plurality of ball elements 43 disposed therebetween. In this form of the invention, however, grooves 44 are provided on the outer periphery of the outer race 42 instead of on the inner surface of the retainer ring. Nevertheless, the grooves 44 serve the same function as the groove 39 of FIGURE 2, in that they interrupt the film of lubricant which tends to form between the confronting surface of the outer race and the wall of the retainer.

An alternator assembly was made up employing a bearing assembly of the type shown in FIGURE 3 of the drawings. Two grooves were ground into the outer race of the ball bearing, and the grooves were filled with grease and the retainer bore was coated with grease. The bearings were then inserted in the alternator assembly. A standard load test was run on the alternator, and it was then run in for one hour. Operation of the alternator was exceptionally quiet. The unit was then disassembled for inspection, reassembled, run for another ten hours, and again disassembled for inspection. A visual inspection of the bearing showed no indication of relative rotation between the outer race and the retainer.

While the drawings illustrate two grooves existing between the outer bearing race and the retainer wall, it should be evident that the optimum number of grooves and the width of the grooves required to permit slight bearing creep will depend on the bearing diameter, the width, the load, and the lubrication conditions.

It should be evident that other modifications can be made to the described embodiments without departing from the scope of the present invention.

I claim:

1. A ball bearing assembly comprising an inner race, an outer race, a plurality of balls confined between said inner and outer races, a retainer ring adapted to engage in a bearing housing and having its inner periphery in radially confronting relation to the outer periphery of said outer race, said retainer ring having a radially inwardly extending annular flange portion confronting one end of said outer race member, and a thrust spring extending between said annular flange portion and said one end, the radially confronting surfaces of said retainer ring and said outer race having at least one empty circumferential groove formed therein of sufficient radial depth and extent to disrupt the establishment of a continuous lubricant film between said outer race and said retainer whereby said outer race is maintained by said spring in an axially adjusted relation to said retainer ring and is restrained from rotation relative thereto by lack of establishment of the lubricant film as aforesaid.

2. A ball bearing assembly comprising an inner race, an outer race, a plurality of balls confined between said inner and outer races, a retainer ring adapted to engage in a bearing housing and having its inner periphery in radially confronting relation to the outer periphery of said outer race, said retainer ring having a radially inwardly extending annular flange portion confronting one end of said outer race member, and a thrust spring extending between said annular flange portion and said one end, the inner periphery of said retainer ring having at least one empty circumferential groove formed therein of sufficient radial depth and extent to disrupt the establishment of a continuous lubricant film between said outer race and said retainer ring whereby said outer race is maintained by said spring in an axially adjusted relation to said retainer ring and is restrained from rotation relative thereto by lack of establishment of the lubricant film as aforesaid.

3. A ball bearing assembly comprising an inner race, an outer race, a plurality of balls confined between said inner and outer races, a retainer ring adapted to engage in a bearing housing and having its inner periphery in radially confronting relation to the outer periphery of said outer race, said retainer ring having a radially inwardly extending annular flange portion confronting one end of said outer race member, and a thrust spring extending between said annular flange portion and said one end, the outer periphery of said outer face having at least one empty circumferential groove formed therein of sufficient radial depth and extent to disrupt the establishment of a continuous lubricant film between said outer race and said retainer ring whereby said outer race is maintained by said spring in an axially adjusted relation to said retainer ring and is restrained from rotation relative thereto by lack of establishment of the lubricant film as aforesaid.

References Cited by the Examiner

UNITED STATES PATENTS

| 1,220,633 | 3/17 | Hirth | 308—236 X |
| 2,324,676 | 7/43 | Butterfield | 308—236 X |
| 2,345,952 | 4/44 | Smith | 308—189 |
| 2,362,938 | 11/44 | Short | 308—236 X |
| 2,837,382 | 6/58 | Schaefer | 308—236 |
| 2,877,068 | 3/59 | Schaefer | 308—236 |
| 3,036,872 | 5/62 | King | 308—236 |

ROBERT C. RIORDON, *Primary Examiner.*